United States Patent [19]

Rappoport et al.

[11] Patent Number: 5,175,231

[45] Date of Patent: Dec. 29, 1992

[54] URETHANE OLIGOMERS AND POLYURETHANES

[75] Inventors: Leonid Rappoport; Roger D. Brown, both of Louisville, Ky.

[73] Assignee: Fiber-Cote Corporation, Louisville, Ky.

[21] Appl. No.: 870,284

[22] Filed: Apr. 17, 1992

[51] Int. Cl.$^5$ .............................................. C08G 59/40
[52] U.S. Cl. ................................... 528/106; 528/111; 528/121; 528/370; 560/25; 560/26; 560/115; 560/158
[58] Field of Search ............... 528/106, 111, 121, 370; 560/25, 26, 115, 158

[56] References Cited

U.S. PATENT DOCUMENTS

| | | |
|---|---|---|
| 2,802,022 | 8/1957 | Groszos et al. ................... 260/471 |
| 2,928,812 | 3/1960 | Ernst ................................. 260/67.5 |
| 3,277,098 | 10/1966 | Merten et al. .................... 260/287 |
| 3,929,731 | 12/1975 | Volkova et al. ................ 260/77.5 B |

FOREIGN PATENT DOCUMENTS 1495555 12/1977 United Kingdom .

*Primary Examiner*—Maurice J. Welsh
*Attorney, Agent, or Firm*—Theresa F. Camoriano

[57] ABSTRACT

A urethane is formed in a new way, without requiring the use of isocyanates. The urethane is formed by reacting a compound containing a plurality of cyclocarbonate groups with a diamine in which the two amine groups have different reactivities with cyclocarbonate, so as to form a urethane oligomer with amine end groups. The urethane oligomer can then be reacted in several different ways to form polyurethane.

15 Claims, No Drawings

URETHANE OLIGOMERS AND POLYURETHANES

BACKGROUND

The present invention relates to urethanes.

Polyurethanes are polymers which have a high degree of strength, hardness, and friction resistance. They are used as adhesives, cements, and coatings.

Polyurethanes are polymeric compounds which contain repeating urethane groups:

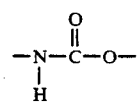

In the past, polyurethanes have generally been made from di-isocyanates, which are highly toxic, non-stable, and react with water, such as moisture in the air. The solvents which have been used to dissolve the known polyurethanes are organic solvents, such as acetone, dioxane, and sometimes benzene, which are very volatile and which become air pollutants as they evaporate.

Some reactions are known for producing polyurethanes without the use of di-isocyanates, by reacting cyclocarbonate groups with amines, but these reactions have had the problem that they have not completely polymerized or hardened. It is said that the reaction has a tendency to "stick", meaning that it stops reacting before the polymerization is complete.

SUMMARY OF THE INVENTION

The present invention provides an improved method for making polyurethanes which eliminates the need for using toxic di-isocyanates while still providing a completely polymerized product.

The present invention provides a structure which eliminates the "sticking" problem in the polymerization process.

In a preferred embodiment, it also provides a method for making a water-soluble polyurethane, which eliminates the air pollution concerns of using volatile organic solvents. Since the polyurethane is soluble in water in a wide range of ratios, it can be used in spraying operations, in which the preferred ratio is 50% solids, which is not possible with other polyurethanes.

Since the present reaction does not require the use of highly toxic materials such as di-isocyanates, it is possible to perform the reaction without special equipment. Most importantly, the hardening of the polyurethane of the present invention can be conducted on-site, open to the atmosphere, so that the polymerization (polycondensation) reaction takes place in the pores of the substrate, making a very strong bond between the polymer and the substrate.

An additional advantage is gained by using a water-soluble polyurethane of the present invention for the on-site hardening with cross-linking, because the water permits the polyurethane to be more readily carried into the pores of certain substrates, such as concrete and wood, than would be possible with an organic solvent.

There is also the possibility of combining the urethane-containing hardener with water and with an epoxide resin in a closed container. The water will prevent hardening, so the closed container can be taken to the site where the polymer is to be used, can be applied onto a substrate, and then hardening will take place as the water evaporates.

DESCRIPTION OF THE PREFERRED EMBODIMENTS

In general, the synthesis of urethanes and polyurethanes of the present invention is conducted as follows:

I. First, any epoxide resin or polyfunctional epoxy is reacted with carbon dioxide to form an oligomer with cyclocarbonate groups. It is preferable for at least some of the molecules in the epoxide resin to have more than two epoxy groups in their structure, so that the overall functionality of the epoxide resin is greater than two, in order to promote cross-linking in the final product. We will first show the reaction here with an epoxide compound containing two epoxy groups, which, upon reaction with carbon dioxide, become two cyclocarbonate groups. The preferable arrangement, using an epoxide resin with a functionality greater than two, will be shown later.

It is preferable to use an epoxide with a molecular mass of 200 to 1000 per epoxide group. When the molecular mass becomes too large, the reactivity of the molecule decreases, which is undesirable. The epoxide resin preferably has a flexible structure and preferably includes oxygen in its structure, both for flexibility and for solubility in water (i.e. polyoxypropylene structure). The viscosity of the epoxide resin is preferably under 600 centipoise (25 degrees C.). The epoxide resin is reacted with carbon dioxide in the presence of a catalyst which is preferably a quaternary salt of ammonium.

In this reaction, the main structure of the initial epoxide resin is preserved; the functionality of the epoxide resin is mostly preserved; but the epoxide group is converted to a cyclocarbonate group. This reaction is shown below:

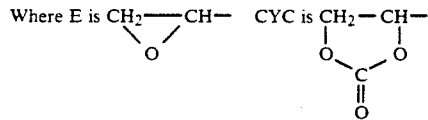

and $R_1$ is the polymer root for any epoxide resin (the epoxide resin with the epoxy groups removed).

The following example shows the reaction when there are three epoxy groups on the initial epoxide resin:

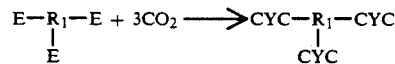

The epoxide resin that is used generally is a combination of epoxides with a functionality of two and epoxides with a functionality of three, so that the overall functionality is greater than two.

II. The second stage of the reaction is to synthesize an oligomer which has amine end groups and has urethane groups and hydroxyl groups in its structure. The oligomer with two or more cyclocarbonate groups which was formed from the first stage reaction is reacted with a diamine as shown below to form a urethane oligomer, including a urethane group and a hydroxyl group where each cyclocarbonate group previously was.

If a diamine having amine groups of equal reactivity were used in this second stage reaction, the oligomers would interact, forming a polyurethane compound. However, in the present invention, a special type of diamine is used for the second stage reaction which prevents the oligomers from total hardening or cross-linking. The diamine used in the present invention has amine groups with different reactivities, so that one of the amines reacts readily with the oligomer and the other tends not to react.

In the examples described below, the oligomer with cyclocarbonate groups that results from the stage I reaction is in water solution, and the second stage reaction takes place in a water solution. This greatly reduces the toxicity problems from working with diamines and provides for a smooth reaction to proceed.

As was stated above, in the present invention, the diamine that is used includes amine group which have different reactivities with the cyclocarbonate groups. One of the amine groups is more reactive with the cyclocarbonate group than the other. As a result, the more reactive amine groups react with their respective cyclocarbonate groups, and the amine groups with low reactivity do not react or react in negligible amounts, resulting in oligomers, each containing urethane groups, hydroxyl groups, and amine end groups, but the oligomers do not polymerize or completely cross-link. This reaction is shown below, first with the three-functional cyclocarbonate compound, and then with the two-functional cyclocarbonate compound:

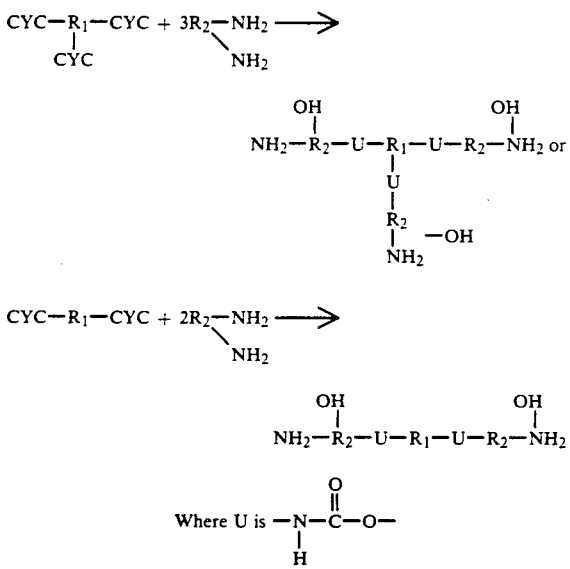

and $R_2$ is the root of the diamine (the diamine with the amine groups removed). The oligomer formed with a functionality of three gives an indication of how the cross-linking will be able to take place in the third stage of the reaction. The straight chain oligomer having two amine end groups as shown above is intended to be a generic description of all oligomers produced from this process, having a functionality of two or more.

The resulting urethane-containing oligomers with amine end groups can then serve as amine solidifiers for epoxide resins and as solidifiers for other compounds which have the ability to react with the amine or hydroxyl end groups.

At this point, we have a material (the urethane-containing oligomer with the hydroxyl and amine end groups) that has substantial advantages over the prior art. It has the strength and hardness imparted by the urethane group. Because of the hydroxyl and oxygen groups (the oxygen groups are preferably provided by the $R_1$ structure in the original epoxide resin, such as polyoxypropylene), these oligomers are soluble in water, which eliminates the problems of air pollution from organic solvents. By stopping the reaction after the urethane groups are formed but before completion of polycondensation or cross-linking, we have taken control of a reaction that was previously uncontrollable.

III. The third stage of the process is a reaction of the urethane-containing amine solidifier, which was synthesized from the second stage reaction, with an epoxide resin, which permits condensation polymerization and cross-linking to occur, forming a cured "non-isocyanate" polyurethane with cross-linking between the oligomer molecules. Any epoxide resin may be used. If the functionality of the urethane-containing oligomers is not greater than two, then the epoxide resin's functionality should be greater than two in order to help in forming cross-links. Preferably, the functionality of the urethane-containing oligomers will be greater than two, so any epoxide resin can be used. In addition to the hardness imparted by the urethane groups, this polymer has the benefit of various characteristics from the epoxide resins used to form it.

The practical applications of this invention are very interesting. For example, we can now take the stage II product (the urethane-containing amine solidifier) and an epoxide resin, provide them as a kit, and give the end user the ability to mix the urethane oligomer with the epoxide resin, apply it on a substrate, and allow the cross-linking to occur on-site, in the pores of the substrate, so that the resulting polyurethane fills the pores of the substrate, resulting in a strong bond between the polyurethane and the substrate, which was never possible with polyurethanes before. In other words, the present invention provides a material that has a combination of all the advantages of known epoxide resins plus the hardness, strength and flexibility of polyurethane.

EXAMPLE 1

Stage I

The starting material used in this reaction was Heloxy 84, an epoxy sold by Rhone-Poulenc. Heloxy 84 is a polyoxypropylene oligomer having epoxide end groups, having a molecular weight of 620-680 per epoxide, functionality approximately 2.5, viscosity (25 degrees C.) 200-320 cps. 18.8 kg of this epoxide resin was loaded into a ten-gallon reactor, giving a loading of approximately 50-60%. Then a quaternary ammonium salt was added as a catalyst. In this case, the catalyst was di(methyl-benzyl ammonium chloride) in an 80% solution with a water-ethanol mixture (7% water, 13% ethanol). The weight of catalyst was approximately 0.5% of the weight of the oligomer.

The reactor was jacketed for temperature control, and the temperature was maintained at approximately 240 degrees F. The reactor had a radial turbine agitator which was then turned on, and then carbon-dioxide was introduced into the bottom of the reactor to a pressure of approximately 130-150 pounds per square inch. The agitator mixed the liquid and gas into a foam for good surface contact and good reaction. Samples of the material in the reactor were taken at intervals and analyzed for concentration of epoxide groups until the conversion reached approximately 90-97%, which took several hours.

The resulting oligomer with the epoxide groups converted to cyclocarbonate groups has a molecular weight of approximately 760, with the cyclocarbonate group content being approximately 28% of the total molecular weight. This product is a liquid and has a higher viscosity than that of the original epoxide resin.

It should be noted that this reaction takes place at a relatively low pressure in comparison with other processes for the production of cyclocarbonates (i.e. ethylene- and propylene-cyclocarbonate). In those reactions, the reactants are all gases, requiring high pressure, whereas, in this reaction, the advantage is that one reactant is liquid and the other is a gas, permitting the reaction to take place at much lower pressure (using much less expensive equipment).

Stage II

The diamine solution was prepared by dissolving 190 grams of isophorone diamine in 107 grams of water. Isophorone diamine (IPD) is a product of Huls America and has a structure with two amine groups of different reactivities—one alifatic amine and one cycloalifatic amine—the alifatic amine being much more reactive than the cycloalifatic amine to cyclocarbonate groups. This 297 gram solution of IPD in water was charged into the reactor, which again is jacketed for temperature control. To the solution of IPD and water were added 335 grams of the cyclocarbonate oligomer from the Stage I reaction. The reactor was operated at atmospheric pressure, and the cyclocarbonate oligomer was added in several small portions, because the reaction is exothermic, and caution was being used to prevent the temperature from exceeding 60 degrees C. It was feared that, if all the cyclocarbonate oligomer were added at once, the heat of reaction might exceed the cooling capacity of the chilled water cooling system.

After all the cyclocarbonate oligomer was added to the reactor, samples were taken and measured for amine group concentration, as the reactants were stirred and the temperature was held for one hour at approximate 20-25 degrees C. When the amine group concentration stopped changing, the reaction was determined to be complete. The content of amine groups in the finished product was approximately 50% of the initial amine group concentration, with the initial concentration being 6.3% and the final concentration being 3.8%, indicating that the reactive, alifatic amine groups had reacted with the cyclocarbonate groups, and the less reactive, cycloalifatic amine groups had not reacted significantly.

The result of this reaction was an oligomer with amine end groups and urethane and hydroxyl groups in its structure that was soluble in water and had a molecular weight of approximately 1180. Some of this oligomer was mixed with water and put in a freezer to test the solubility of the oligomer in water, and, for 100 grams of oligomer in any amount of water up to 150 grams of water, the oligomer was completely soluble in the water and did not freeze down to a temperature of −20 degrees Celsius. Colder temperatures were not tested, so it is not known at what temperature the solution would freeze.

Stage III

The urethane-containing oligomer from the Stage II reaction was then combined with Epon 828, an aromatic epoxide resin made by Shell Chemical Company, having a molecular weight of 400 and epoxide group content of 23%, to form a hard, cross-linked polymer with solidity approximately 90 (Shore A).

EXAMPLE 2

Stage I

This example is similar to Example 1, except that the starting material was the epoxide resin Heloxy 502 by Rhone-Poulenc. This epoxide resin has a weight of 290-325 per epoxide group, a viscosity of 45-90 (at 25 degrees C.), and a functionality of approximately 2.5.

After reacting with carbon-dioxide, the result was a cyclocarbonate oligomer with molecular weight of approximately 270 and cyclocarbonate concentration of approximately 30%.

Stage II

The cyclocarbonate oligomer from the Stage I reaction was combined in a cooled reactor with IPD as in Example 1, with 270 grams of the cyclocarbonate oligomer introduced into a solution of IPD in water (330 grams IPD and 165 grams water). The conditions of the reaction were the same as in Example 1. The initial amine group concentration was 8.1%, and the final amine group concentration was 4.2%, indicating that approximately half of the amine groups had reacted, as in the first example. The result was an oligomer with amine end groups, containing urethane groups and hydroxyl groups, and having a molecular weight of 680. The resultant oligomer was soluble in water.

Stage III

The resultant oligomer from the Stage I reaction was mixed at room temperature and atmospheric pressure with Epon 828, as in Example 1. It then cross-linked and hardened.

EXAMPLE 3

Stage I

This reaction was the same as in the first example, except that the starting material was Heloxy 5044 from Rhone-Poulenc. Heloxy 5044 is an epoxide resin with functionality approximately 2.5, molecular weight 150 per epoxide group, and viscosity 125-250 centipoise (25 degrees C.). After reacting with the carbon-dioxide, the result was a cyclocarbonate oligomer having molecular weight of 260 and a cyclocarbonate groups concentration of 75%.

Stage II

This reaction was the same as in the first example, except that it used the result from this Stage I reaction, combining 260 grams of the cyclocarbonate oligomer from Stage I with 410 grams of IPD dissolved in water (50% solution). The initial amine group concentration was 9.1, and the final amine group concentration was 4.8, indicating that approximately half of the amine groups of the IPD had reacted with the cyclocarbonate groups of the cyclocarbonate oligomer. The molecular weight of the resulting oligomer with urethane groups, hydroxyl groups, and amine end groups was 670, and the product was soluble in water.

Stage III

The amine oligomer from Stage II was combined with EPON 828, the same epoxide resin as in Example 1, cross-linked, and hardened.

EXAMPLE 4

Stage I

This portion of the reaction was conducted the same as Stage 1 of Example 1.

Stage II

In this reaction, a different diamine was used. In this case, trimethyl-hexamethylene diamine (TMD) was used, which has amine end groups of different reactivities. In TMD, both of the amine end groups are alifatic amines. The difference in reactivities of the two amine end groups of this material with cyclocarbonate groups is very temperature dependent, so the reaction must be kept at a relatively low temperature in order to prevent both amine groups from reacting, which would result in a cross-linked product.

TMD (395 grams) was dissolved in a 50% solution with water. 760 grams of the cyclocarbonate oligomer from the Stage I reaction were charged into the reactor, and the TMD solution was then added in three portions, keeping the temperature below 60 degrees C.

The initial amine group concentration was 6.5%, and the final amine group concentration was 3.8%. The molecular weight of the resulting amine oligomer containing urethane groups, hydroxyl groups and amine end groups was 1155, and the product was soluble in water.

Stage III

The amine oligomer from Stage II was mixed with EPON 828 epoxide resin at room temperature and atmospheric pressure, resulting in a hardened, cross-linked product.

EXAMPLE 5

Stage I

This reaction was identical to that in Example 3, using Heloxy 5044 as the starting material.

Stage II

The cyclocarbonate oligomer from the Stage I reaction was reacted with the TMD solution under the same conditions as in the second stage of Example 4. The initial amine concentration was 9.1%, and the final amine concentration was 4.8%. The molecular weight of the resulting amine oligomer was 670, and this oligomer was water soluble.

Stage III

The amine oligomer from the Stage II reaction was combined with the aromatic epoxide resin EPON 828 as in the previous examples. It cross-linked and hardened.

In the Stage III reactions, it was noted that the oligomers formed by reacting the cyclocarbonate with IPD were slow-curing when mixed with the epoxide resins, whereas the oligomers formed by reacting the cyclocarbonate with TMD polymerized very quickly.

The amine oligomers resulting from all the Stage II reactions can serve as a "flexible", water-soluble hardener for epoxide resins. These amine oligomers are much less toxic than other amine hardeners. This, in itself, is a great improvement over the prior art, in which most amine solidifiers are extremely toxic products. There is negligible diamine monomer in these reactions, so there is very little diamine in a free state at the end of the reaction.

All the Stage II reactions took place at atmospheric pressure, which is another great advantage over the prior art.

The amine oligomer from the Stage II reactions can serve as an epoxy hardener, as shown in the Stage III reactions. It can also serve as a hardener for acrylate as shown below:

EXAMPLE 6

The oligomers from the Stage II reaction of Example 1 were mixed in a 1:1 ratio with an acrylated oligomer product by Readcure Specialties Inc. called TMPEOTA. This acrylated oligomer is on a base of tri-methylolpropane and has a molecular mass of approximately 300. After ten minutes at ambient temperature, a cross-linked polyurethane was formed.

All the reactants needed for these reactions are readily available on the market.

The high pressure, pollution, and high temperatures present in prior art reactions for producing urethanes are absent in the present invention. Hazardous conditions are greatly minimized.

The process is completely non-flammable. In Stage I, a carbon-dioxide blanket (which is customarily used to extinguish fires) is used as part of the reaction. The second stage reaction takes place in solution with water, again in nonflammable conditions, and, the final product dissolved in water is also less hazardous.

The urethane-containing amine oligomers created by the Stage II reactions can be the basis for many new polymers, by reacting the Stage II product with epoxides or acrylates (oligomers which react with the amine groups or the hydroxyl groups of the urethane-containing oligomers).

It will be obvious to those skilled in the art that modifications may be made to the embodiments described above without departing from the scope of the present invention.

What is claimed is:

1. An oligomer having at least one urethane group and having at least one end fragment containing an amine group, wherein said oligomer is stable at atmospheric pressure and room temperature.

2. An oligomer as recited in claim 1, wherein said oligomer also has a hydroxyl group in the end fragment.

3. An oligomer as recited in claim 2, wherein the ratio of urethane groups to hydroxyl groups to amine groups in the end fragments is 1:1:1.

4. An oligomer as recited in claim 1, wherein said oligomer includes a plurality of urethane groups, a plurality of hydroxyl groups, and a plurality of amine end groups.

5. An oligomer as recited in claim 1, wherein said oligomer is soluble in water and is stable in a solution containing only the oligomer and water.

6. An oligomer as recited in claim 1, wherein said oligomer is stable in a solution with water which does not contain significant excess monomer amines.

7. An oligomer having the formula:

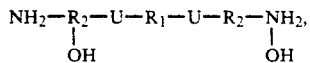

where U is

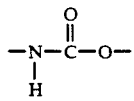

$R_1$ is the root of an epoxide resin with the epoxide groups removed, and $R_2$ is the root of a diamine with the amine groups removed.

8. An oligomer as recited in claim 7, where $R_1$ has a molecular weight up to 1000.

9. An oligomer as recited in claim 7, where $R_1$ is an oligomer of polymerized propylene oxide.

10. An oligomer as recited in claim 7, where $R_2$ includes a cycloalifatic ring.

11. A new method, including the step of reacting a compound including a plurality of cyclocarbonate groups with a diamine having two amine groups of different reactivities, to form an oligomer having at least one urethane group and at least one amine end group.

12. A new method as recited in claim 11, wherein the oligomer that is formed has a plurality of urethane groups, a plurality of hydroxyl groups, and a plurality of amine end groups; and including the additional step of reacting that oligomer with an epoxide resin to form a hardened, cross-linked polyurethane.

13. A new method as recited in claim 11, wherein the oligomer which is formed has at least one amine group and at least one hydroxyl group in an end fragment, and including the additional step of reacting that oligomer with a second oligomer that reacts with the amine group or the hydroxyl group to form a polyurethane.

14. A new method as recited in claim 13, wherein the second oligomer is an epoxy or an acrylate.

15. An oligomer as recited in claim 1, wherein said oligomer is soluble in water, and any mixture of the oligomer and water in a mass ratio of from 1:0.2 to 1:1.5 remains liquid at least down to a temperature of $-20$ degrees Celsius.

* * * * *

UNITED STATES PATENT AND TRADEMARK OFFICE
CERTIFICATE OF CORRECTION

PATENT NO. : 5,175,231

DATED : December 29, 1992

INVENTOR(S) : Leonid Rapporport, et. al.

It is certified that error appears in the above-identified patent and that said Letters Patent is hereby corrected as shown below:

Column 9, lines 1-5, the chemical formula should appear as follows:

$$NH_2-R_2-U-R_1-U-R_2-NH_2,$$
$$\phantom{NH_2-}|\phantom{R_2-U-R_1-U-}|$$
$$\phantom{NH_2-R_2}OH\phantom{-U-R_1-U-R}OH$$

Signed and Sealed this

Thirtieth Day of November, 1993

Attest:

BRUCE LEHMAN

Attesting Officer

Commissioner of Patents and Trademarks